(12) United States Patent
Yamamoto et al.

(10) Patent No.: US 7,637,657 B2
(45) Date of Patent: Dec. 29, 2009

(54) ELECTRONIC THERMOMETER

(75) Inventors: Tetsuya Yamamoto, Saitama (JP); Isamu Kobayashi, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 308 days.

(21) Appl. No.: 11/909,762

(22) PCT Filed: Mar. 14, 2006

(86) PCT No.: PCT/JP2006/305037

§ 371 (c)(1),
(2), (4) Date: Sep. 26, 2007

(87) PCT Pub. No.: WO2006/103923

PCT Pub. Date: Oct. 5, 2006

(65) Prior Publication Data

US 2009/0074029 A1 Mar. 19, 2009

(30) Foreign Application Priority Data

Mar. 29, 2005 (JP) ............................. 2005-093869
Jul. 5, 2005 (JP) ............................. 2005-196290

(51) Int. Cl.
*G01K 7/00* (2006.01)
*G01K 3/00* (2006.01)

(52) U.S. Cl. ..................... 374/169; 374/163; 374/170; 374/102; 600/549; 702/131

(58) Field of Classification Search ......... 374/100–104, 374/141, 163, 169, 170, 178, 179, 183, 185, 374/171–172; 702/130–131; 600/474, 549
See application file for complete search history.

(56) References Cited

U.S. PATENT DOCUMENTS 4,541,734 A     9/1985     Ishizaka (Continued)

FOREIGN PATENT DOCUMENTS

JP        5571919 A       5/1980

(Continued)

OTHER PUBLICATIONS

Notification of Transmittal of Translation of the International Preliminary Report on Patentability (Form PCT/IB/338) of International Application No. PCT/JP2006/305037 mailed Oct. 18, 2007 with Forms PCT/IB/326; PCT/IB/373 and PCT/ISA/237.
International Search Report of PCT/JP2006/305037, date of mailing May 23, 2006.

*Primary Examiner*—Gail Verbiotsky
(74) *Attorney, Agent, or Firm*—Westerman, Hattori, Daniels & Adrian, LLP

(57) ABSTRACT

An electronic thermometer includes a temperature sensing means for sensing a temperature of a part to be measured, and a prediction means for calculating an equilibrium temperature according to the temperature being sensed. The prediction means includes a parameter determination unit for calculating parameters of a prediction function having three parameters to obtain an equilibrium predicted temperature, and an equilibrium predicted temperature calculation means for calculating an equilibrium temperature during a period of the thermal equilibrium time, based on the parameters determined by the parameter determination unit. The parameter determination unit determines parameters held by the prediction function, based on three (or two) sensed temperatures and the measuring times thereof. According to the prediction function, the equilibrium temperature can be predicted with a small number of samplings, and the parameters are determined based on the sensed temperature and the measuring time of the sensed temperature. Consequently, the number of samplings to predict the equilibrium temperature is reduced, as well as solving a problem that the equilibrium temperature may be varied due to an external factor, individual difference, and the like.

12 Claims, 16 Drawing Sheets

U.S. PATENT DOCUMENTS

| | | | |
|---|---|---|---|
| 4,565,456 A * | 1/1986 | Iida et al. | 374/169 |
| 4,843,577 A * | 6/1989 | Muramoto | 702/131 |
| 5,738,441 A * | 4/1998 | Cambridge et al. | 374/102 |
| 6,059,452 A * | 5/2000 | Smith et al. | 374/169 |
| 6,439,768 B1* | 8/2002 | Wu et al. | 374/169 |
| 6,974,463 B2* | 12/2005 | Magers et al. | 606/105 |
| 2002/0003832 A1* | 1/2002 | Siefert | 374/169 |
| 2003/0023398 A1* | 1/2003 | Lantz et al. | 702/130 |
| 2006/0165149 A1* | 7/2006 | Kolk | 374/1 |
| 2006/0224349 A1* | 10/2006 | Butterfield | 702/130 |
| 2007/0055171 A1* | 3/2007 | Fraden | 600/549 |
| 2009/0129433 A1* | 5/2009 | Zhang et al. | 374/102 |

FOREIGN PATENT DOCUMENTS

| | | |
|---|---|---|
| JP | 6076609 A | 5/1985 |
| JP | 259418 B2 | 12/1990 |
| JP | 47456 B2 | 2/1992 |
| JP | 792407 B2 | 10/1995 |

* cited by examiner

FIG. 7A [STEP3]
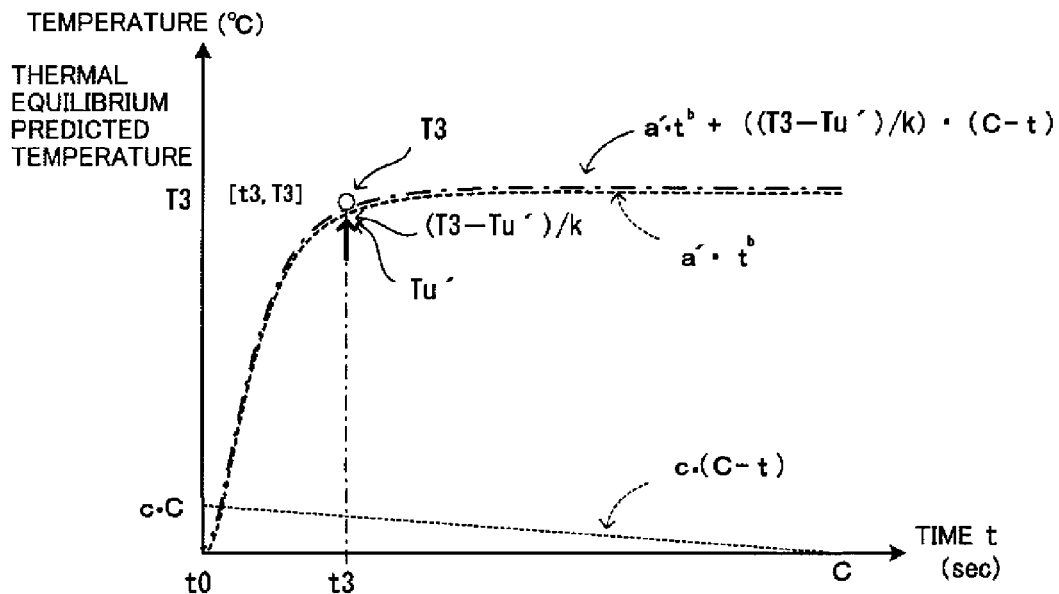
FIG. 7B [STEP4]
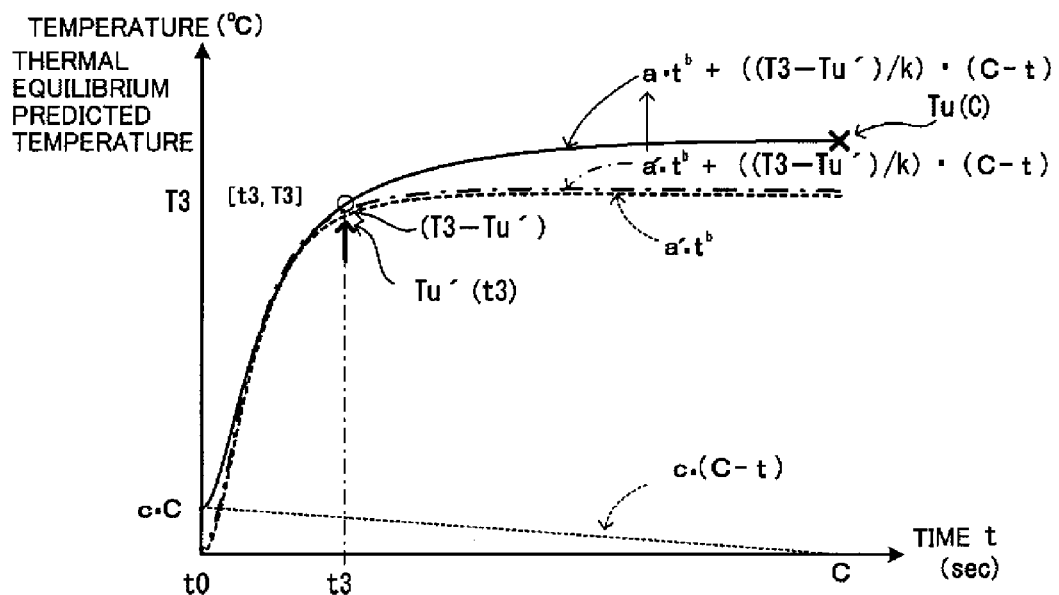

ELECTRONIC THERMOMETER

TECHNICAL FIELD

The present invention relates to an electronic thermometer that predicts an equilibrium temperature based on a sensed temperature.

BACKGROUND ART

Generally, the electronic thermometer includes a temperature sensor to sense a body temperature, and a detection signal from this temperature sensor is subjected to a signal processing, so as to display an actual measurement value. Since just after starting the measurement, there is a difference between the temperature of the sensor and the body temperature, it takes time to attain a thermal equilibrium state between the temperature sensor and a part to be measured.

Therefore, in the electronic thermometer, an equilibrium temperature in the thermal equilibrium state is predicted based on a change in the actual measurement value. The predictive value is sequentially updated and displayed, and thereby reducing the measuring time.

The prediction of the equilibrium temperature is carried out, typically, by monitoring the measured temperature and its rate of change, and calculating a prediction function using the measured temperature and the rate of change as variables. There are proposed various electronic thermometers, which predict the equilibrium temperature by utilizing this prediction function.

By way of example, in the prediction of the equilibrium temperature according to the prediction function, there is a problem that prediction accuracy is deteriorated if the prediction function that is used for the temperature prediction is not appropriate. In order to solve this problem, an electronic thermometer having the following function is proposed: More than one prediction functions are prepared to predict the equilibrium temperature, and the equilibrium temperature is predicted at specified time intervals. When a difference between a current equilibrium temperature predictive value and a previous equilibrium temperature predictive value is out of a predetermined range, a new predicted function is selected. On the other hand, if it falls in the predetermined range, the equilibrium temperature predictive value is displayed, and the predictive calculation is continued (see patent document 1).

For a prediction of the equilibrium temperature enabling a reduction of influences of individual differences on the measurement accuracy, another type of electronic thermometer having the following function is proposed: Temperature values outputted from a sensor is sampled, a parameter part of the linear TL=A−t't is calculated by the regression method, based on a logarithmic value of time differentiation of each detection output. Here, "TL" represents the logarithmic value of the time differentiation of each detection output, "t" represents time, and both "A" and "t'" represent parameter parts. Then, the predictive calculation is performed to obtain a body temperature after attaining the thermal equilibrium state, based on the value being calculated (see patent document 2).

For predicting an equilibrium temperature without an influence of an initial temperature and a thermal time constant of the sensor, there is another electronic thermometer being proposed, having the following function: Values of three points T1, T2, and T3 in the state before the sensor and an object to be measured attain the thermal equilibrium are used, and an equilibrium temperature is predicted by Tu=T2^2− T1T3)/(2T2−T1−T3). It is to be noted here that the sign "^" represents exponentiation (see patent document 3).

Patent document 1: Japanese Examined Patent Application Publication No. 02-59418

Patent document 2: Japanese Examined Patent Application Publication No. 04-7456

Patent document 3: Japanese Unexamined Patent Application Publication No. 55-71919

DISCLOSURE OF THE INVENTION

Problems to be Solved by the Invention

In the above case where a prediction function to be used is selected from multiple prediction functions for every measurements, a control for prediction becomes complicated, and there is a structural problem that such multiple prediction functions have to be prepared in advance. Furthermore, there is another problem that if an appropriate prediction function is not selected, a predictive value cannot be obtained.

In the case where the calculation is performed by the regression method, accuracy can be enhanced by increasing the number of samplings. However, there is a problem that it takes long time until the predictive value is determined. On the other hand, if the number of samplings is decreased with the aim of reducing the measuring time, there is a problem that an accurate predictive value cannot be obtained.

The prediction function Tu=T2^2−T1T3)/(2T2−T1−T3) is based on a theoretical formula Tu−T=(Tu−T0)e^(−t/t). Here, "Tu" represents a thermal equilibrium temperature, "T0" represents an initial temperature, "T" is a sensed temperature, "t" represents time, "t" represents a thermal time constant, and the sign "^" represents exponentiation. This theoretical formula is established setting an ideal temperature rise as a model, and the obtained prediction function does not include any flexibility that depends on the object to be measured. Therefore, there is a problem that due to an external factor, an individual difference, and the like, it is not possible to always determine an accurate predictive value.

An object of the present invention is to solve the problems above, and the number of samplings for predicting the equilibrium temperature is decreased, as well as reducing the influences from the external factor, individual difference, and the like.

Means to Solve the Problems

The electronic thermometer according to the present invention includes a temperature sensing means for sensing a temperature of a part to be measured, and a prediction means for calculating an equilibrium temperature in accordance with the temperature having been sensed.

The prediction means includes, a parameter determination unit to determine a parameter for a prediction function having three parameters for obtaining an equilibrium predicted temperature:

Tu=c·(C−t)+a·t^b,

Tu: thermal equilibrium predicted temperature, t: measuring time from starting of measurement, a, b, c; parameters, C: time constant, and ^: exponentiation, and a thermal equilibrium predicted temperature calculation means for calculating an equilibrium temperature during a period of the thermal equilibrium time, based on the parameters determined by the parameter determination unit.

Since this prediction function can predict the equilibrium temperature by three parameters only, the equilibrium temperature can be predicted with a small number of samplings.

By determining the parameters based on the sensed temperature and the measuring time for obtaining the sensed temperature, it is possible to generate a prediction function coupled with elements of external factor, individual difference, and the like, via the variables of the sensed temperature and the measuring time. Therefore, the problem that the equilibrium temperature to be predicted may vary due to the external factor, individual difference, and the like can be solved.

Here, in the prediction function $Tu=c \cdot (C-t)+a \cdot t^b$, parameter "b" is a parameter to define a shape of a prediction curve, parameter "a" is a parameter to define a scale factor of the prediction curve the shape of which has been defined by the parameter b. Parameter "c" is a parameter to linearly correct the shape from the starting of measurement until the point of thermal equilibrium. In other words, a simple formula, in which the temperature rise curve is approximated by the term "$a \cdot t^b$" of the prediction function, and the curve is corrected by the term of "$c \cdot (C-t)$" being a linear function, enables an accurate prediction of the temperature at the time of thermal equilibrium, as well as simplifying a design of the prediction means.

The parameter determination unit is capable of determining three parameters of the aforementioned prediction function Tu, by a stepwise arithmetic process, or one arithmetic process.

When the parameter is obtained by the stepwise arithmetic process, in the first step, the parameter c is set to zero in the prediction function $Tu=c \cdot (C-t)+a \cdot t^b$, and by using two sensed temperatures, i.e., the first sensed temperature and the second sensed temperature and the respective measuring times, among the three sensed temperatures, the parameter b is determined and the parameter a is tentatively determined.

Next, in the second step, a measuring time of the third sensed temperature is substituted into the prediction function using the parameter a and the parameter b, as well as setting the parameter c to zero, thereby calculating the thermal equilibrium predicted temperature. Further in the third step, the parameter c is determined by using a difference between the calculated thermal equilibrium predicted temperature and the third sensed temperature, and in the fourth step, the parameter a is redetermined by substituting the parameter b, the parameter c, the third sensed temperature, and the measuring time of the third sensed temperature into the prediction function.

As another example of the stepwise arithmetic process to determine the three parameters, in the prediction function $Tu=c \cdot (C-t)+a \cdot t^b$, the parameter c is set to zero, and by using two sensed temperatures, i.e., the first sensed temperature and the second sensed temperature and the respective measuring times, among the three sensed temperatures, the parameter b is determined and the parameter a is tentatively determined. In the second step, a parameter c is determined from the relationship among the parameter b, the first sensed temperature, and the parameter c, and in the third step, the parameter a is redetermined by substituting the parameters b, the parameter c, the second sensed temperature, and the measuring time of the second sensed temperatures, into the prediction function. According to these steps above, the three parameters are determined.

If the parameters are determined by one arithmetic process, the parameter determination unit determines the parameter a, the parameter b, and the parameter c according to three simultaneous equations obtained by substituting three sensed temperatures and the measuring times into the prediction function. The aforementioned sensed temperatures and the measuring times substituted into the prediction function to obtain the parameters may respectively be assumed as the sensed temperature and the measuring time of the sensed temperature at the first point, the sensed temperature and the measuring time of the sensed temperature at the second point after a lapse of predetermined time from the first point, and the sensed temperature and the measuring time of the sensed temperature at the third point after a lapse of predetermined time from the second point.

The stepwise arithmetic process obtains three parameters in steps. As for the parameter a, it is tentatively determined, and thereafter it is redetermined. With this stepwise arithmetic process, it is possible to reduce more loads onto an element for arithmetic processing such as a CPU, than obtaining all the parameters by solving the three simultaneous equations.

The prediction means according to the present invention includes a temperature gradient calculation unit for calculating a temperature gradient, based on a temperature sensed by the temperature sensing means. This temperature gradient calculation unit obtains a sensed temperature and a time to measure the sensed temperature at the first point, among two or three sensed temperatures, when the temperature gradient thereof falls in a predetermined range.

The prediction means according to the present invention includes a timer unit. This timer unit keeps time from the temperature sensing at the first point, and obtains each of the second measuring time and the third measuring time after a lapse of a predetermined time from the measuring time at the first point.

The thermal equilibrium predicted temperature calculation means according to the present invention calculates a thermal equilibrium predicted temperature, by substituting a thermal equilibrium prediction time into measuring time "t" of the prediction function determined by the parameter a, the parameter b, and the parameter c.

Alternatively, the thermal equilibrium predicted temperature calculating means according to the present invention may calculate the thermal equilibrium predicted temperature by substituting the thermal equilibrium prediction time to the measuring time t of the prediction function determined by the parameter b and the tentatively determined parameter a. Further alternatively, the thermal equilibrium predicted temperature calculation means calculates the thermal equilibrium predicted temperature for the first time by substituting the thermal equilibrium prediction time into the measuring time t of the prediction function using the parameter b and the tentatively determined parameter a. Then, the thermal equilibrium prediction time is substituted into the measuring time t of the prediction function determined by the parameter a, the parameter b, and the parameter c, and the thermal equilibrium predicted temperature for the second time is calculated. In this manner, calculation of the thermal equilibrium predicted temperature may be carried out at multiple steps.

An arithmetic time constant "C" provided in the prediction function "Tu" can be assumed as the thermal equilibrium prediction time. In obtaining an equilibrium temperature at the time of thermal equilibrium prediction, t is set to be equal to C, and the thermal equilibrium predicted temperature can be calculated.

In addition to the aspect as described above, the parameter determination unit and the prediction means according to the present invention may include another aspect of the invention. In this aspect of the invention, the prediction is performed by using two data points.

The parameter determination unit of the second aspect of the invention determines the parameter a, the parameter b, and the parameter c, based on two sensed temperatures and the measuring times of the respective sensed temperatures.

The parameter determination unit sets the parameter c to zero, and by using the first sensed temperatures and its measuring time and the second sensed temperatures and its measuring time, the parameter b is determined and the parameter a is tentatively determined. The parameter c is obtained from the relationship among the parameter b, the first sensed temperature, and the parameter c, and the parameter a is redetermined by substituting the parameters b, the parameter c, the second sensed temperature, and the measuring time of the second sensed temperature.

The prediction means includes a temperature gradient calculation unit to calculate a temperature gradient based on the temperature sensed by the temperature sensing means.

The temperature gradient calculation unit assumes the sensed temperature and the measuring time of the sensed temperature at the time when the temperature gradient of the sensed temperature falls in a predetermined range, as the first point among the two sensed temperatures and measuring times thereof.

The prediction means may further include a timer unit.

The timer unit keeps time from the temperature sensing at the first point, and the time after a lapse of predetermined time from the measuring time at the first point is assumed as the measuring time at the second point.

In each of the aspects of the invention as described above, the thermal equilibrium predicted temperature calculation means substitutes the thermal equilibrium prediction time into the measuring time t of the prediction function determined by the parameter a, the parameter b, and the parameter c, thereby calculating the thermal equilibrium predicted temperature.

EFFECT OF THE INVENTION

The electronic thermometer according to the present invention makes a determination by the following prediction function having three parameters to obtain the equilibrium predicted temperature:

Tu=c·(C−t)+a·t^b,

Tu: thermal equilibrium predicted temperature, t; measuring time from starting of measurement, a, b, c: parameters, C: time constant, and ^: exponentiation.

Therefore, in addition to determining the prediction function itself with a small number of samplings, an equilibrium temperature can be predicted.

Furthermore, since the electronic thermometer according to the present invention determines the parameters defining the prediction function, by using the sensed temperature and the measuring time thereof, the prediction function can respond to an external factor, individual differences, and the like, thereby reducing fluctuations due to such external factor, individual differences, and the like.

In addition, a simple formula that approximates the temperature rise curve by the term "a·t^b" of the prediction function, and corrects the curve by the term of "c·(C−t)" being a linear function, enables an accurate prediction of the temperature at the time of thermal equilibrium, and thereby simplifying a design of the prediction means.

BRIEF DESCRIPTION OF THE DRAWINGS

FIG. 7 shows charts of temperature property curve to explain the operation for obtaining the predicted temperature of the electronic thermometer according to the present invention;

DESCRIPTION OF THE MARKS

1 TEMPERATURE SENSING MEANS
1a TEMPERATURE SENSOR
1b TEMPERATURE MEASURING UNIT
2 PREDICTION MEANS
2a PREDICTIVE CALCULATION DATA HOLDER
2b PREDICTION ARITHMETIC UNIT
2b1 PARAMETER DETERMINATION UNIT
2b2 THERMAL EQUILIBRIUM PREDICTED TEMPERATURE CALCULATION UNIT
2b3 TABLE UNIT
2c TEMPERATURE GRADIENT CALCULATION UNIT
2d TIMER UNIT
3 DISPLAY MEANS

3a DISPLAY SWITCHING UNIT
3b DISPLAY UNIT
4 BUZZER
5 PREVIOUS VALUE STORING MEANS
6 CONTROL MEANS

BEST MODE FOR CARRYING OUT THE INVENTION

Hereinafter, the electronic thermometer according to the present invention will be explained in detail, with reference to the accompanying drawings.

Figure 1:
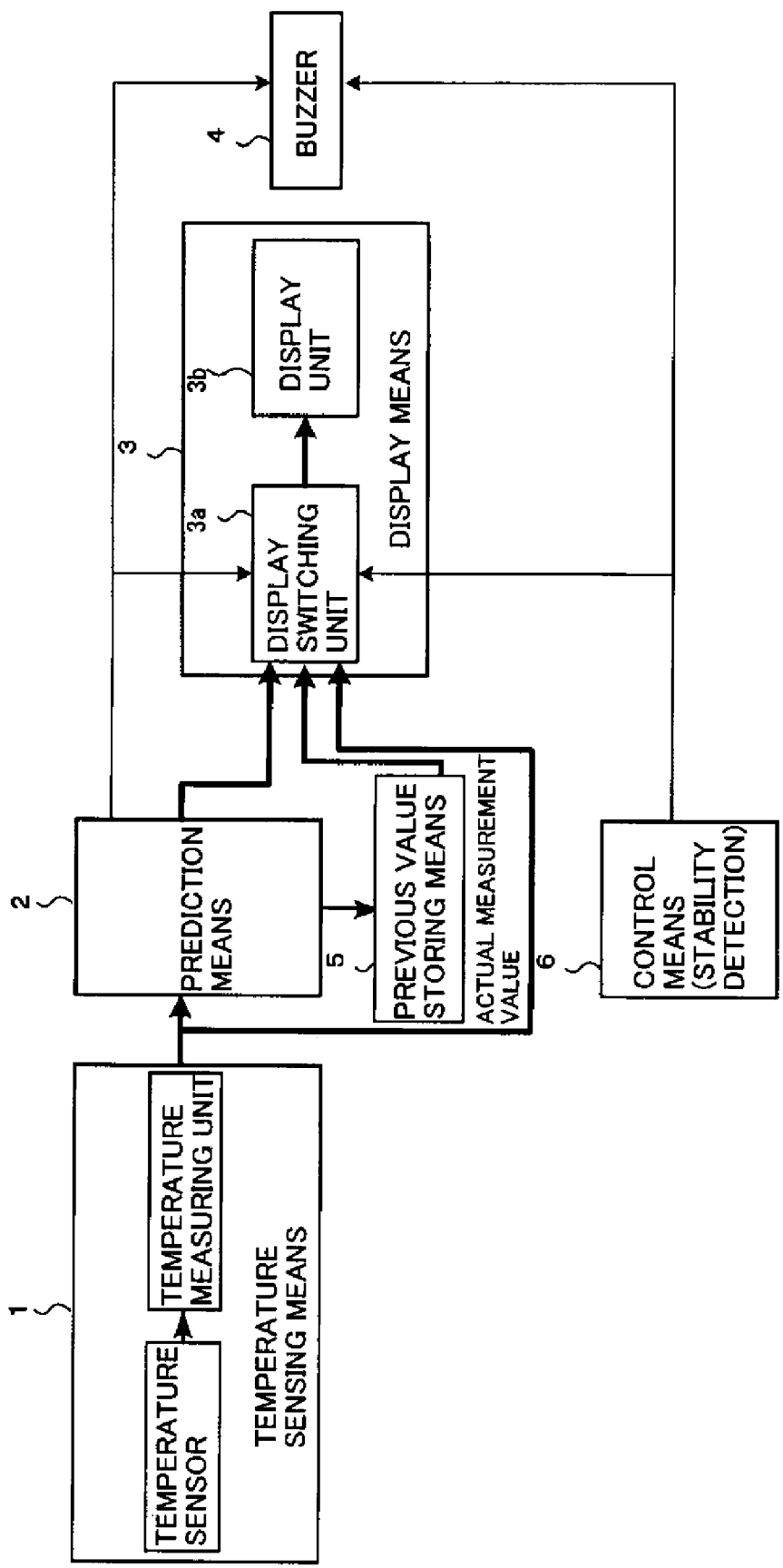
FIG. 1 is a diagram to explain a schematic configuration of an electronic thermometer according to the present invention.

FIG. 1 is a diagram to explain a schematic configuration of the electronic thermometer according to the present invention.

The electronic thermometer includes a temperature sensing means 1 for sensing a temperature of a part to be measured, a prediction means 2 for calculating a temperature at a time of thermal equilibrium by using an actual measurement value sensed by the temperature sensing means 1, a display means 3 for displaying a predictive value predicted by the prediction means 2, a buzzer 4 for notification by a sound of the predictive value being displayed, a previous value storing means 5 for storing a previous measured value or the predictive value, and a control means 6 for controlling a drive of the electronic thermometer, in addition to the display means 3 and the buzzer 4.

The temperature sensing means 1 includes a temperature sensor 1a that measures a temperature of the part of the object to be measured, and a temperature measuring unit 1b that converts a sensed signal outputted from the temperature sensor 1a into a temperature signal, and outputs the converted signal as an actual measurement value. The temperature measuring unit 1b is provided with an A/D converter, and outputs the actual measurement value in a form of digital value.

The display means 3 includes a display unit 3b for displaying the predictive value or the actual measurement value, and a display switching unit 3a that controls a display switch such as switching from a display of the predictive value to a display of the actual measurement value.

The display unit 3b displays the predictive value that has been predicted by the prediction means 2, and further displays a previous actual measurement value or a previous predictive value which are stored in the previous value storing means 5. In addition, when the predictive value is switched to the actual measurement value after the measured value is stabilized, this actual measurement value is displayed by the display unit 3b. It is further possible to display a status of displaying as appropriate, for the information such as being in the course of prediction, displaying the predictive value, and displaying the actual measurement value.

The control means 6 controls the electronic thermometer entirely, and in addition, detects whether or not the measured value is stabilized, so as to control the display switching unit 3a for switching the display. On the occasions such as the predictive value is displayed, and the display is switched from the predictive value display to the actual measurement value display, the buzzer 4 is driven to make a notification by sound. It is to be noted that the prediction means 2 will be described below with reference to FIG. 4.

Figure 2:
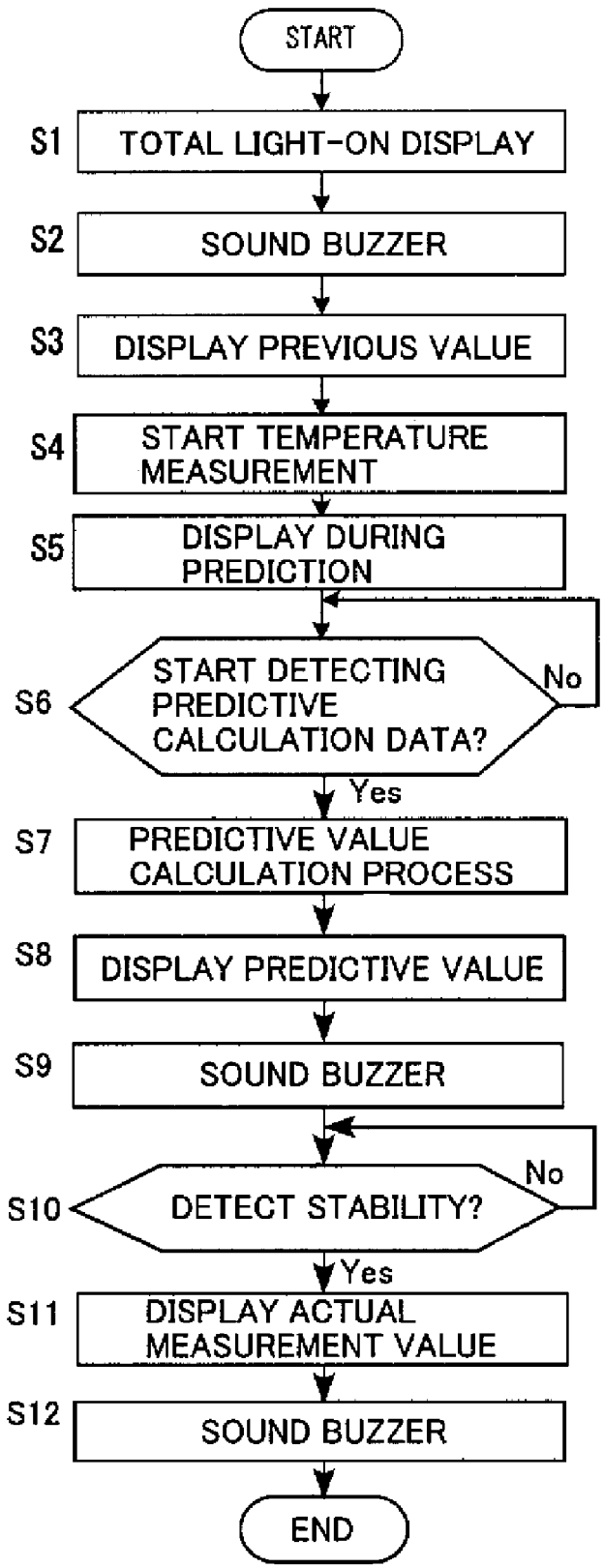
FIG. 2 is a flowchart to explain an operation example of the electronic thermometer according to the present invention.

With reference to the flowchart shown in FIG. 2, an operation example of the electronic thermometer according to the present invention will be explained. In the following flowchart, each step excluding the step S7 may be the same as the operation example of a conventional electronic thermometer that calculates a predicted temperature. A control of each step is exerted by the control means constituted from a CPU, a memory storing control programs, and the like.

When the switch of the electronic thermometer is turned ON, by a display operation such as lighting on all the display segments of the display means 3 (S1), and a sound operation by the buzzer, it is displayed that the switch is now in the ON state (S2). It is to be noted here that this total light-on operation is just an example, and another display mode may be applicable. After the total light-on display is carried out, the previous measured value is read out and displayed, the value being stored in the previous storing means 5 (S3).

The temperature sensing means 1 starts the temperature sensing, and transfers the sensed actual measurement value to the prediction means 2 and the control means 6 (S4). When the temperature measurement is started, the display means 3 displays that the prediction is being performed now (S5). The prediction means 2 sequentially inputs the actual measurement value sensed by the temperature sensing means 1, captures the actual measurement value at a predetermined point, as a predictive calculation data item (S6), and then, performs a process for calculating the predictive value (S7).

Figure 3:
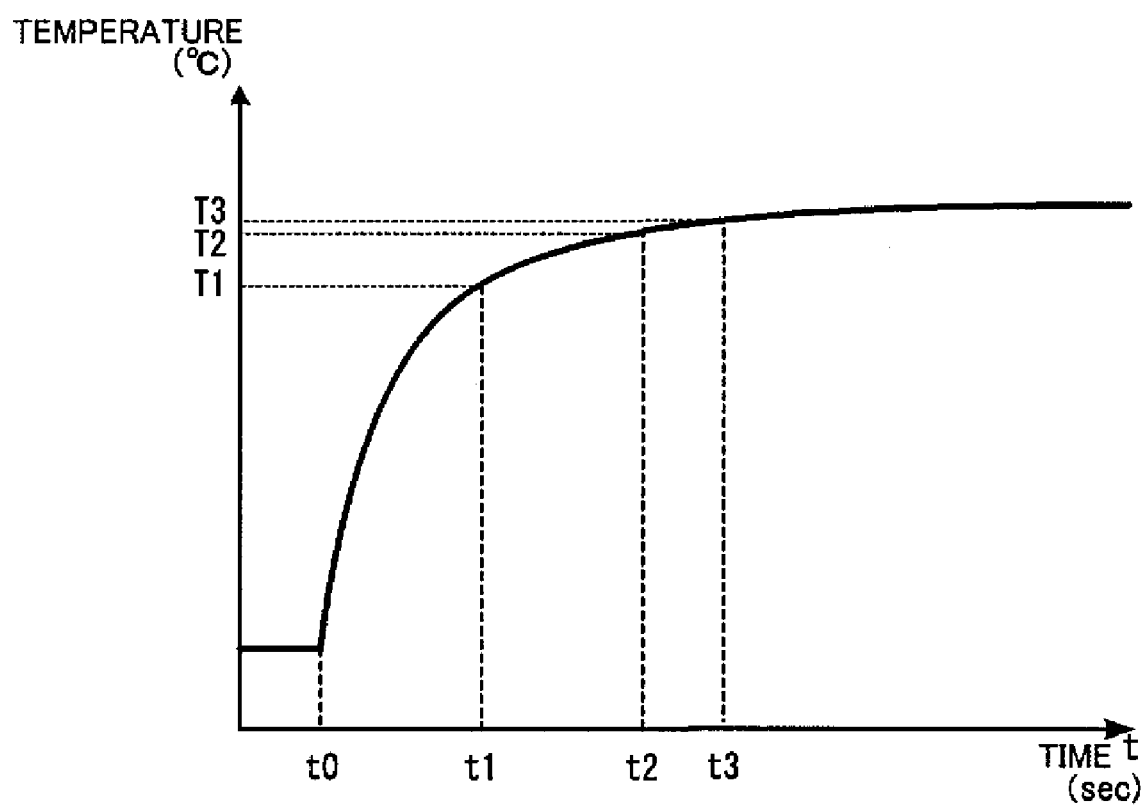
FIG. 3 is a chart to explain an example of predictive calculation data.

It is to be noted here that the number of data items captured as the predictive calculation data and the timing for the capturing can be set in various ways. FIG. 3 is a chart to explain an example of the predictive calculation data. In FIG. 3, after the measurement is started at the time "t0", the first data point (time "t1") is selected based on the rate of temperature increase. Furthermore, each point of time after a lapse of predetermined time from the first point is selected as the second data point (time "t2") and as the third data point (time "t3"), for example, thereby extracting three predictive calculation data items (T1, T2, and T3). Then, these predictive calculation data items (T1, T2, and T3) are applied to a calculation formula for prediction and a predictive value is calculated.

The prediction means 2 transfers the predictive value calculated in the step S7 to the display means 3. Then, the predictive value is displayed (S8) as well as the buzzer 4 is sounded, thereby notifying a user that the predictive value is displayed (S9) (predictive value display mode).

Upon going into the thermal equilibrium state while sensing the temperature, the control means 6 of the electronic thermometer of the present invention detects that the sensed temperature having been fluctuating has attained a stable state (S10), and displays an actual measurement value by the display means 3 (actual measurement value display mode). Here, the display means 3 displays the actual measurement value (S11), and by sounding the buzzer 4, the user is notified that now attaining the stable state (S12).

Figure 4:
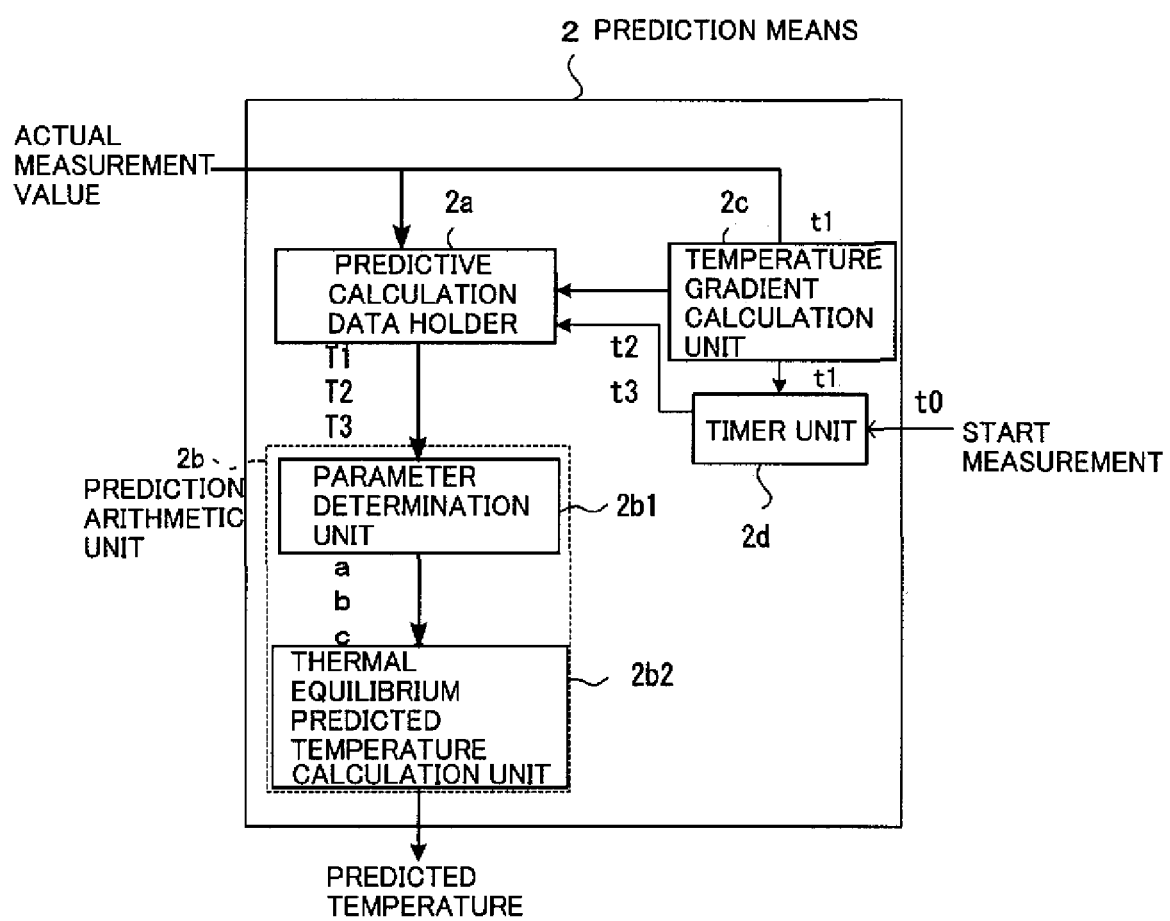
FIG. 4 is a diagram to explain a schematic configuration of a prediction means according to the present invention.

Next, the prediction means provided in the electronic thermometer according to the present invention will be explained. With reference to FIG. 4, a configuration example of the prediction means will be explained, and with reference to the flowchart shown in FIG. 5 and the temperature property curves respectively shown in FIG. 6 to FIG. 8, a prediction operation will be explained. In addition, with reference to FIG. 9 to FIG. 14, there will be explained another aspect of the prediction of the electronic thermometer according to the present invention.

In FIG. 4, the prediction means 2 includes a predictive calculation data holder 2a, a prediction arithmetic unit 2b, a temperature gradient calculation unit 2c, and a timer unit 2d. The temperature gradient calculation unit 2c inputs the actual measurement value from the temperature sensing means 1, and calculates a temperature gradient from the rate of increase. The point of time when this temperature gradient falls in a predetermined range is set as the time "t1" to obtain the first data point, and the actual measurement value "T1" at this timing is held in the predictive calculation data holder 2a. The timer unit 2d starts timekeeping from the point t1 determined in the temperature gradient calculation unit 2c, and keeps time until the points of time each after a lapse of a predetermined time, the second data point and the third data point, which are set as time "t2" and "t3", respectively. The actual measurement values "T2" and "T3" at the time t2 and t3, respectively, are held by the predictive calculation data holder 2a.

Consequently, the predictive calculation data holder 2a stores three predictive calculation data items [t1, T1], [t2, T2], and [t3, T3]. If the prediction of the equilibrium temperature is performed by using the prediction function having two parameters, or the prediction of the equilibrium temperature is performed by using two parameters in the prediction function having three parameters, the predictive calculation data holder 2a may be configured such that only two predictive calculation data items are stored.

The prediction arithmetic unit 2b further includes a parameter determination unit 2b1 and a thermal equilibrium predicted temperature calculation unit 2b2. The parameter determination unit 2b1 uses three or two predictive calculation data items ([t1, T1], [t2, T2], [t3, T3]), so as to determine the parameters ((parameter a, parameter b, and parameter c) or (parameter a and parameter b)) held in the prediction function.

The thermal equilibrium predicted temperature calculation unit 2b2 uses the prediction function that has been decided using the parameters determined in the parameter determination unit 2b1, and calculates a thermal equilibrium predicted temperature, and thereafter the predicted temperature is outputted.

The arithmetic operation of the prediction arithmetic unit 2b will be explained with reference to the flowchart shown in FIG. 5. It is to be noted that the steps S101 to S106, S108, and S109 are operations to hold the predictive calculation data, and those operations are carried out by the predictive calculation data holder 2a, the temperature gradient calculation unit 2c, and timer unit 2d.

When the timer unit 2d detects a start of the measuring (S101), the timekeeping is started setting t=0 (S102). The temperature gradient calculation unit 2c inputs the actual measurement value and calculates its rate of increase. Then, it is determined whether or not the rate of increase falls within a predetermined range. For example, it is determined whether or not a difference value between the actual measurement values inputted at predetermined time intervals falls in the predetermined range. When the actual measurement value previously inputted is assumed as "T(t−1)", and the actual measurement value currently inputted is assumed as "T(t)", the determination of the increase rate can be made by determining whether or not the difference "T(t)−T(t−1)" falls within a temperature range, such as between 0.00° C. and 0.02° C.

The condition in which the temperature difference falls in the temperature range is based on a temperature property shown in body temperature checking, that is, the sensed temperature changes with a large temperature difference at the initial stage of measuring start, and the temperature difference becomes smaller upon approaching the thermal equilibrium state. It is to be noted that the above temperature range is just an example, and a different numerical value may be employed as an example (S103).

In S103, when the temperature difference falls in the predetermined range, the time "t1" and the actual measurement value "T1" at that timing are held in the predictive calculation data holder 2a, and the first data point [t1, T1] is determined (S104).

The timer 2d monitors the lapse of time, and after a lapse of the predetermined time "ta" from the time t1 (S105), the time t2 and the actual measurement value T2 are held in the predictive calculation data holder 2a, and the second data point [t2, T2] is determined (S106). The predetermined time ta to decide the second data point [t2, T2] may be ten seconds, by way of example.

The parameter determination unit 2b1 uses the first data point [t1, T1] and the second data point [t2, T2] to calculate the parameter a and parameter b of the prediction function Tu:

Prediction function $Tu = c \cdot (C-t) + a \cdot t^b$     (EXPRESSION 1)

Here, the prediction function Tu is provided with the following elements:
Tu: thermal equilibrium predicted temperature,
t: measuring time from the start of measurement,
a, b, c: parameters,
C: time constant, and
^: exponentiation.

Figure 6A:
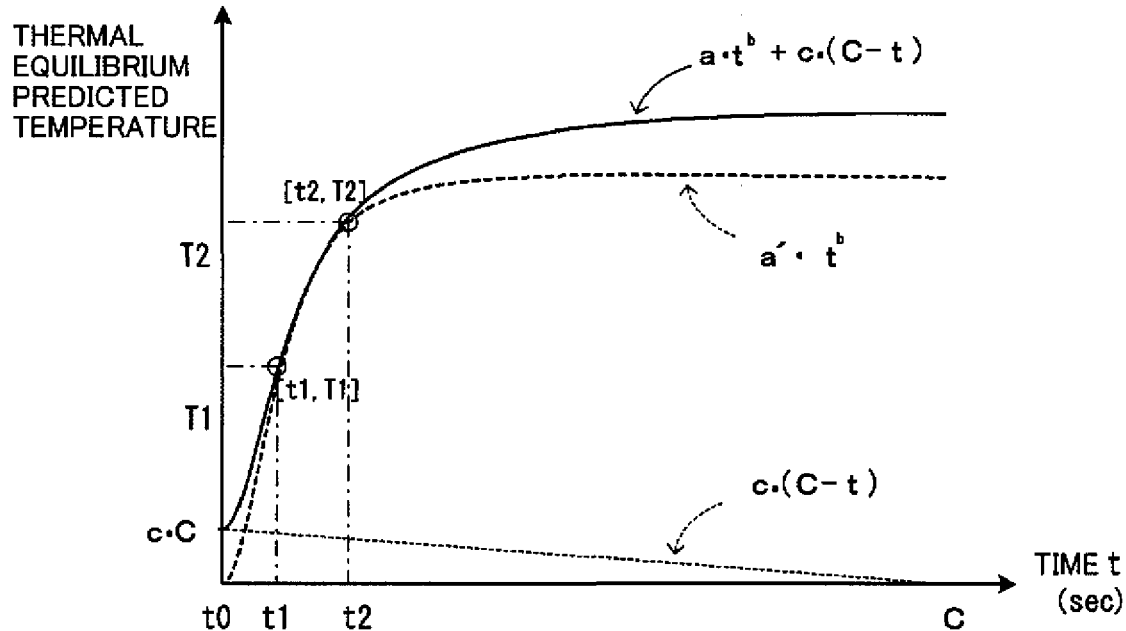
FIG. 6 shows charts of temperature property curve to explain the operation for obtaining the predicted temperature of the electronic thermometer according to the present invention.

The prediction function Tu is expressed by an arithmetic expression including a term "$a \cdot t^b$" representing that a growth rate is decreased along with the time "t", and a term "$c \cdot (C-t)$" serving as a correction term, representing a linear decrease until "0" (time t=C) based on the values of the time "t" and "$c \cdot C$" (time t=0). In FIG. 6A, the prediction function Tu is represented by a solid line.

The parameter a and the parameter b at this timing are calculated, assuming that the parameter c is zero, and when the parameter b is determined while the parameter a is tentatively determined. The parameter a is calculated later, and then redetermined. When the first data point [t1, T1] and the second data point [t2, T2] are substituted into the aforementioned prediction function, the parameter a is tentatively determined according to the following expression:

$lna' = (lnT2 \cdot lnt1 - lnT1 \cdot lnt2)/(lnt1 - lnt2)$     (EXPRESSION 2)

Here, the tentatively determined parameter "a" is represented by "a'".

The parameter b is determined according to the following expression:

$b = ln(T1/T2)/ln(t1/t2)$     (EXPRESSION 3)

The function obtained by using the first data point [t1, T1] and the second data point [t2, T2] corresponds to "$a' \cdot t^b$" represented by the broken line in FIG. 6A (S107).

Next, according to the timer unit 2d, when the predetermine time "tb" has elapsed from the time "T2" (S108), the time "t3" and the actual measurement value "T3" at that timing are held in the predictive calculation data holder 2a, thereby determining the third data point [t3, T3]. The predetermined time tb determining the third data point [t3, T3] may be set to five seconds, by way of example (S109).

Next, the parameter c is set to zero again, and the t3 is substituted into the function "$a' \cdot t^b$" that has been determined in S107, and then the predicted temperature "Tu'(t3) (=$a' \cdot t3^b$)" is calculated (S110). This predicted temperature "Tu'(t3)" is represented by "Tu'" in FIG. 6B.

Here, in the temperature property represented by the function "$a' \cdot t^b$", the parameter "a" is tentatively determined, and the term of "$c \cdot (C-t)$" is not included. Therefore, there is a difference between this function "$a' \cdot t^b$" and the prediction function Tu represented by the above expression (1).

Here, if it is assumed that the actual measurement value T3 at the time t3 is on the prediction function Tu, there is a difference of (T3−Tu') between the predicted temperature "Tu'(t3)" obtained from the temperature property represented by the function "a'·t^b", and the actual measurement value "T3".

It is possible to assume that this difference is generated because the parameter a is a tentatively determined parameter "a'", and the term "c·(C−t)" is not included. Therefore, a function approximated at the prediction function Tu is obtained, by determining the parameter a on which the term "c·(C−t)" has been reflected.

Therefore, the difference of "(T3−Tu')" is calculated (S111) (FIG. 6B), and the prediction function Tu is determined, assuming as the parameter c, the value obtained by multiplying the calculated (T3−Tu') by a predetermined coefficient (1/k) (S112):

$$Tu=((T3-Tu')/k)\cdot(C-t)+a'\cdot t\hat{\ }b \quad \text{(EXPRESSION 4)}$$

In FIG. 7A, the function "a'·t^b" is shown by the broken line, and the prediction function Tu represented by the expression (4) is shown by the dashed-dotted line.

In this state, since the parameter a corresponds to the tentatively determined parameter "a'", the parameter a is redetermined, by substituting the third data point [t3, T3] into the prediction function Tu represented by the expression (4) (S113).

Accordingly, the prediction function Tu represented by the following expression (5) is determined:

$$Tu=((T3-Tu')/k)\cdot(C-t)+a\cdot t\hat{\ }b \quad \text{(EXPRESSION 5)}$$

In FIG. 7B, the broken line shows the function "a'·t^b", and the dashed-dotted line shows the prediction function Tu represented by the expression (4). The solid line shows the prediction function Tu, in which the parameter a is redetermined, represented by the expression (5).

Figure 8:
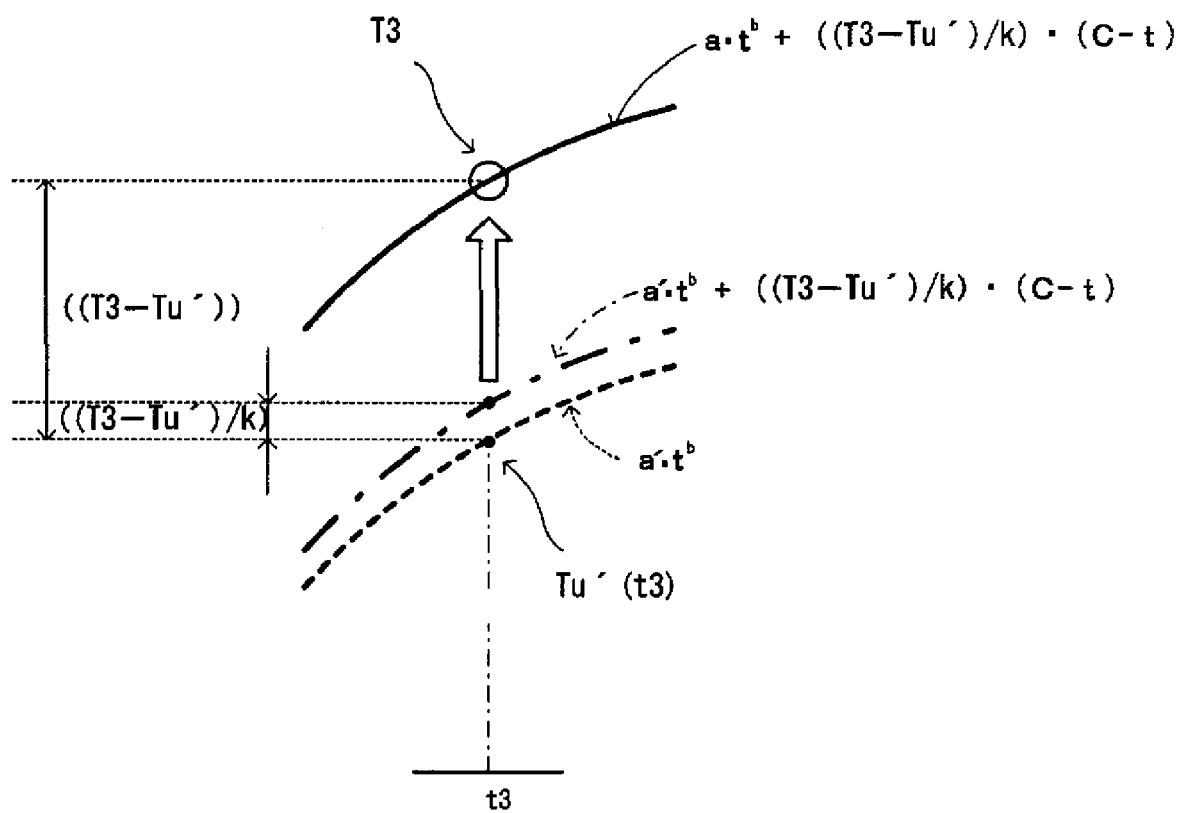
FIG. 8 shows a chart of temperature property curve to explain the operation for obtaining the predicted temperature of the electronic thermometer according to the present invention.

FIG. 8 shows a state of the prediction function on each stage in the steps of S111 to S113. The difference (T3−Tu') is calculated so that the prediction function "a'·t^b" (broken line) using the parameter "a'" tentatively determined in S107 is approximated at the prediction function Tu represented by the expression (1). Assuming that the value (T3−Tu')/k obtained by multiplying the difference (T3−Tu') by the predetermined coefficient (1/k), as a value in the term c·(C−t) at the time t3, the prediction function of expression (4) "Tu= ((T3−Tu')/k)·(C−t)+a'·t^b" is calculated. Furthermore, by substituting the third data point [t3, T3] into this prediction function, the parameter a is redetermined, whereby the prediction function (solid line) represented by the expression (5) is obtained.

Here, the parameter a is represented by the following expression:

$$a=(T3-(T3-a'\cdot t3\hat{\ }b)(C-t3)/k)/t3\hat{\ }b \quad \text{(EXPRESSION 6)}$$

The thermal equilibrium predicted temperature can be calculated by setting t=C in the prediction function represented by the expression (5) (S114). The thermal equilibrium predicted temperature Tu being calculated is displayed on the display unit 3b (S115). In FIG. 7B, the predicted temperature when t=C is represented by "x".

In the above expression (1), it is assumed that the term "c·(C−t)" serving as the correction term varies linearly with respect to "t". However, it is also possible to assume that this term is n-th power with respect to "t", and the prediction function may be represented by the following expression:

$$Tu=c\cdot(C-t)\hat{\ }n+a\cdot t\hat{\ }b \quad \text{(EXPRESSION 7)}$$

Figure 9:
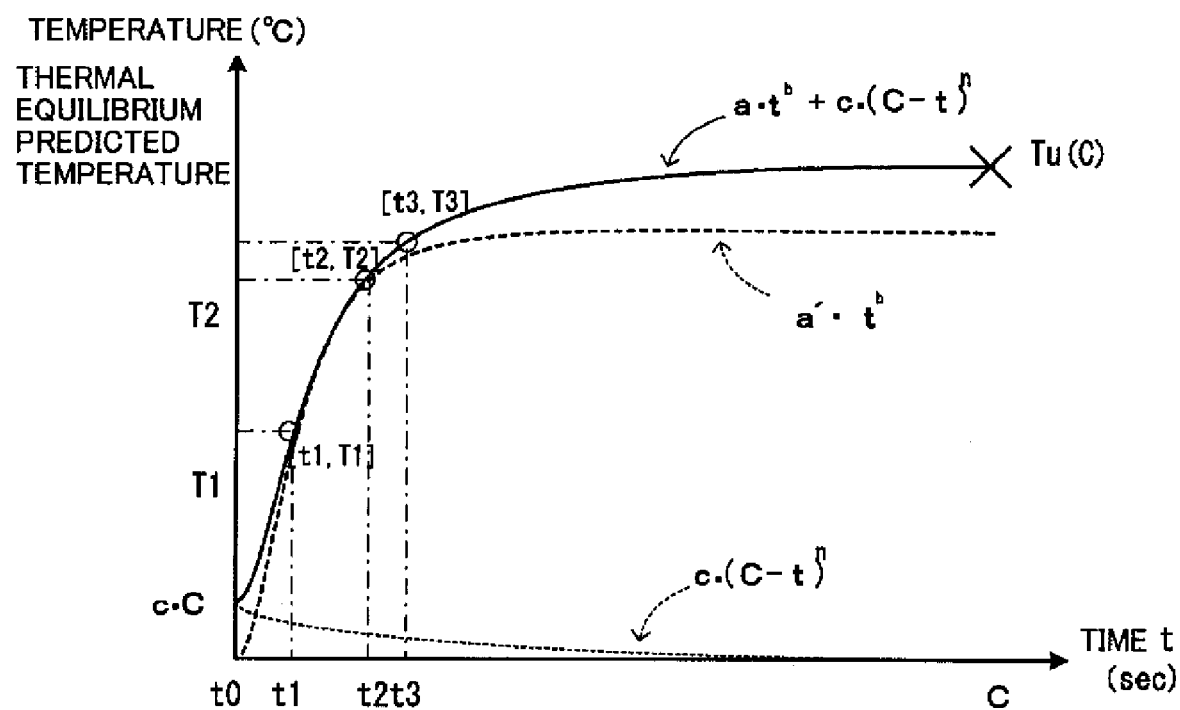
FIG. 9 is a chart of temperature property curve to explain another aspect of the prediction of the electronic thermometer according to the present invention.

FIG. 9 shows an example where the aforementioned term "c·(C−t)" is replaced by "c·(C−t)^n".

According to the term "c·(C−t)^n", the value becomes larger, as the time "t" belongs earlier time zone, thereby more favorably correcting the fluctuations included at the time when the measurement is started.

When the equilibrium temperature is predicted, it is obtained assuming that t=C in the expressions (1) and (7). Therefore, the term "c·(C−t)" or the term "c·(C·t)^n" becomes zero, but as shown in the expression (6), the parameter a is redetermined under the condition including this term, whereby the term for correction can be reflected.

Figure 5:
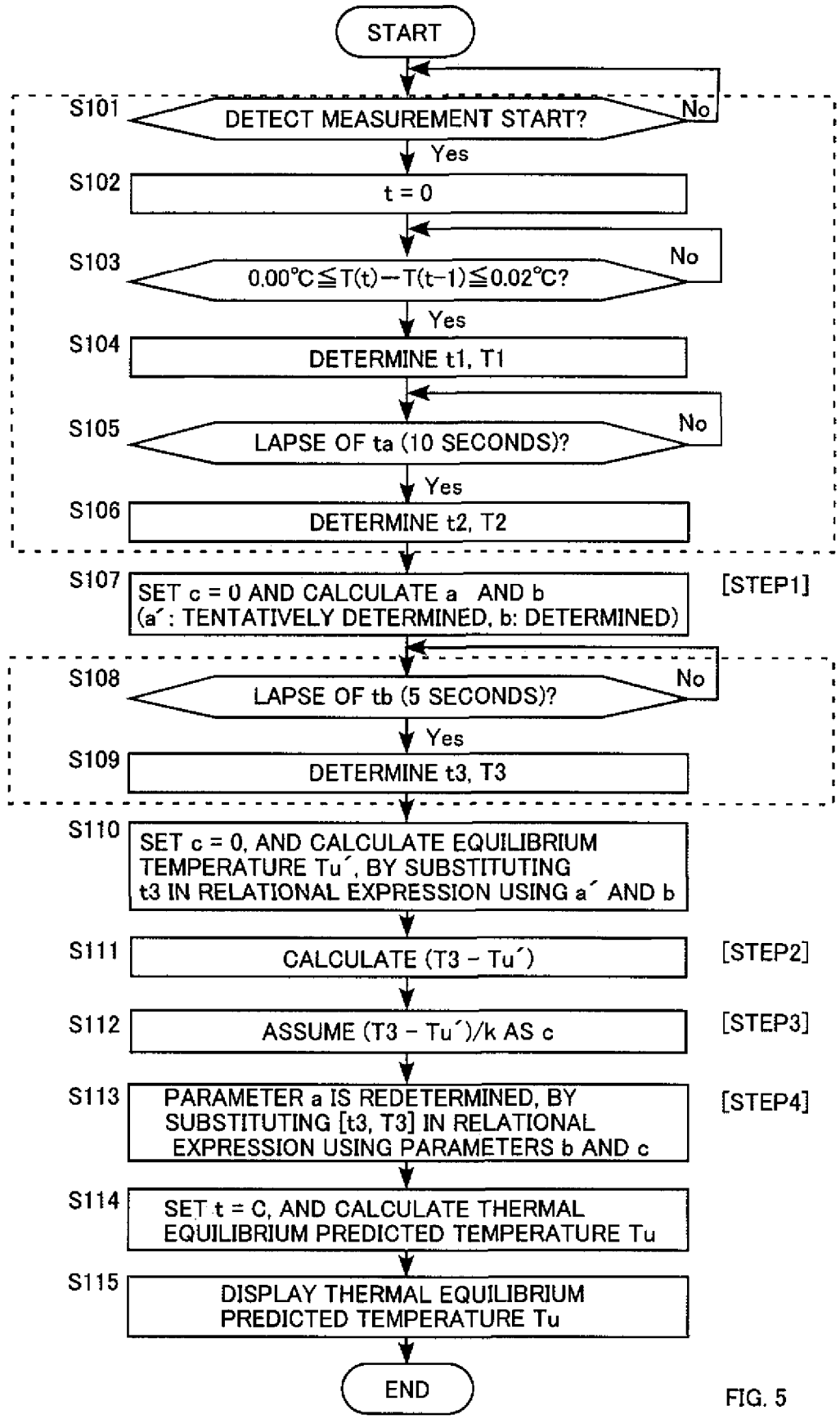
FIG. 5 is a flowchart to explain an operation for obtaining a predicted temperature of the electronic thermometer according to the present invention.
Figure 6B:
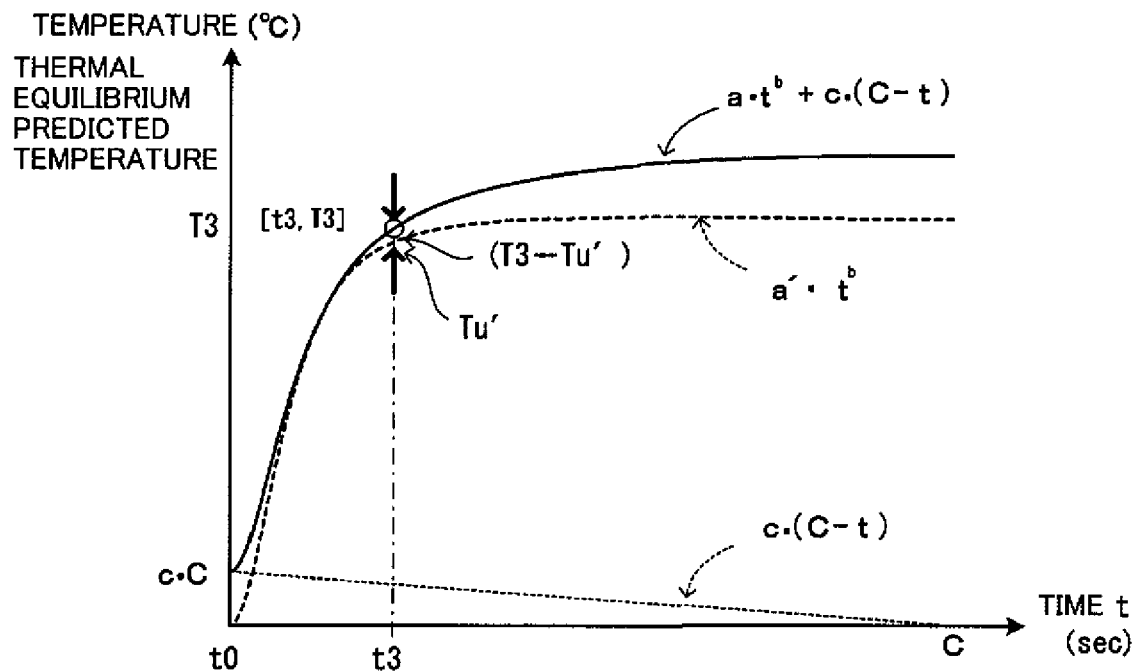

As shown in S114 in the flowchart of aforementioned FIG. 5, the calculation of the equilibrium temperature using the prediction function is performed after the parameters a, b, c are determined using the three data points. In addition to this aspect of the invention, there is another aspect of the invention in which the equilibrium temperature is calculated at two stages.

Figure 10:
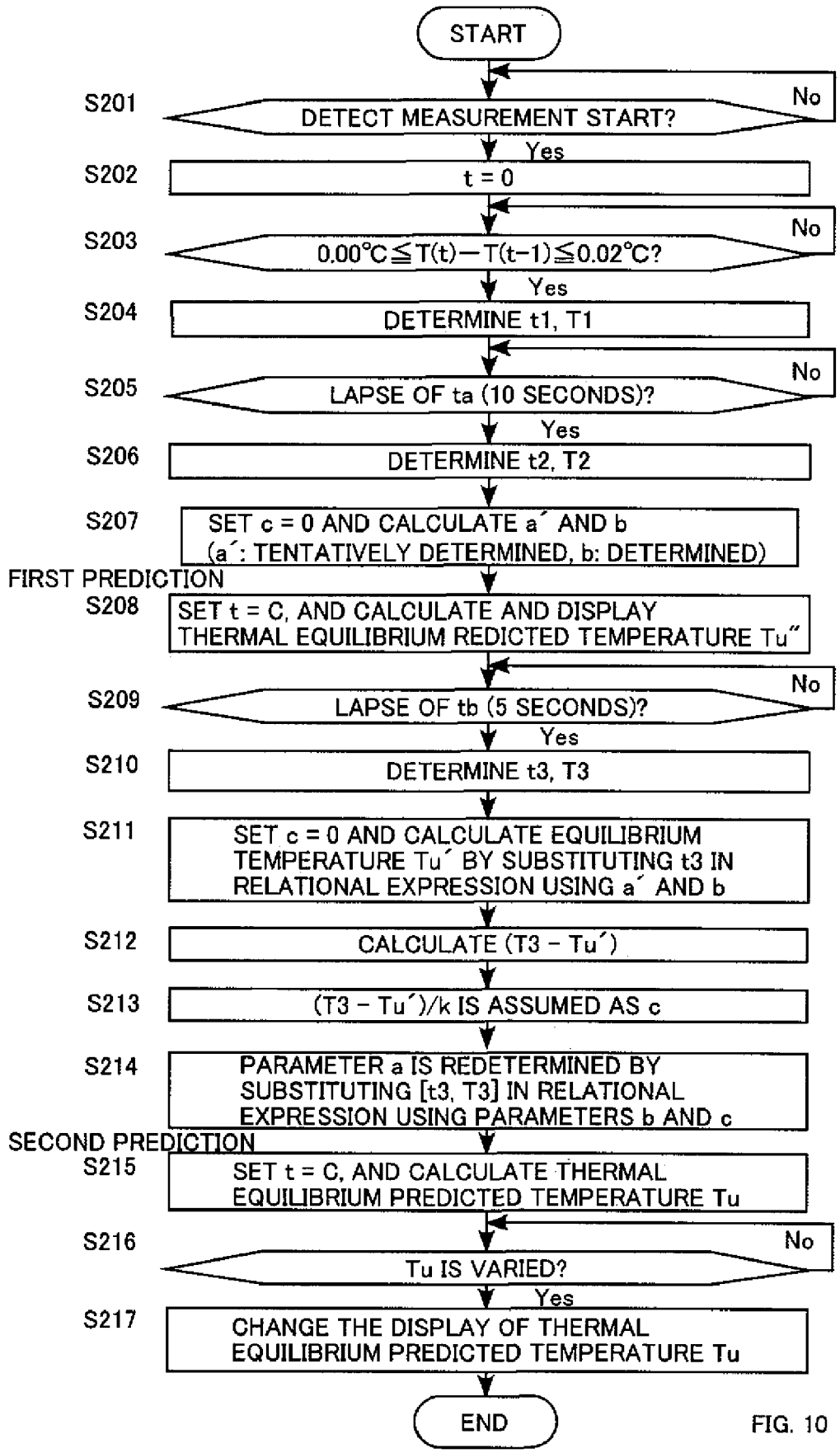
FIG. 10 is a flowchart to explain another operation example for obtaining the predicted temperature of the electronic thermometer according to the present invention.

FIG. 10 shows a flowchart to explain the aspect of the invention in which the equilibrium temperature is calculated at two stages. The flowchart shown in FIG. 10 is almost the same as the flowchart shown in FIG. 5, and there are differences in the steps S208 and S215 to S217. Hereinafter, only the steps including the differences will be explained.

In this aspect of the invention, in S207 (corresponding to S107 in FIG. 5), after the parameter "a'" is tentatively determined and the parameter b is determined, the thermal equilibrium predicted temperature "Tu''(=a'·C^b)" is calculated, setting t=C in the prediction function "a'·t^b" determined by the parameter "a'" and the parameter b. Then, the calculated value is displayed (the first stage display) (S208).

The thermal equilibrium predicted temperature "Tu (=a·C^b)" is calculated, setting t=C, in the prediction function "c·(C−t)+a·t^b" obtained by redetermining the parameter a in S214 (S215). If the calculated "Tu" is different from the value "Tu''" displayed at the first stage (S216), the second stage display is carried out with this calculated value (S217).

In the aforementioned aspect of the invention, the prediction function is obtained in stages, after the parameter a is tentatively determined by using two points among three data points, and the parameter a is redetermined by using the remaining data point. However, it is alternatively possible to obtain the prediction function in one-step, by using the three data points. Hereinafter, with reference to the flowchart in FIG. 11, a procedure to obtain the prediction function in one-step by using three data points, will be explained.

Figure 11:
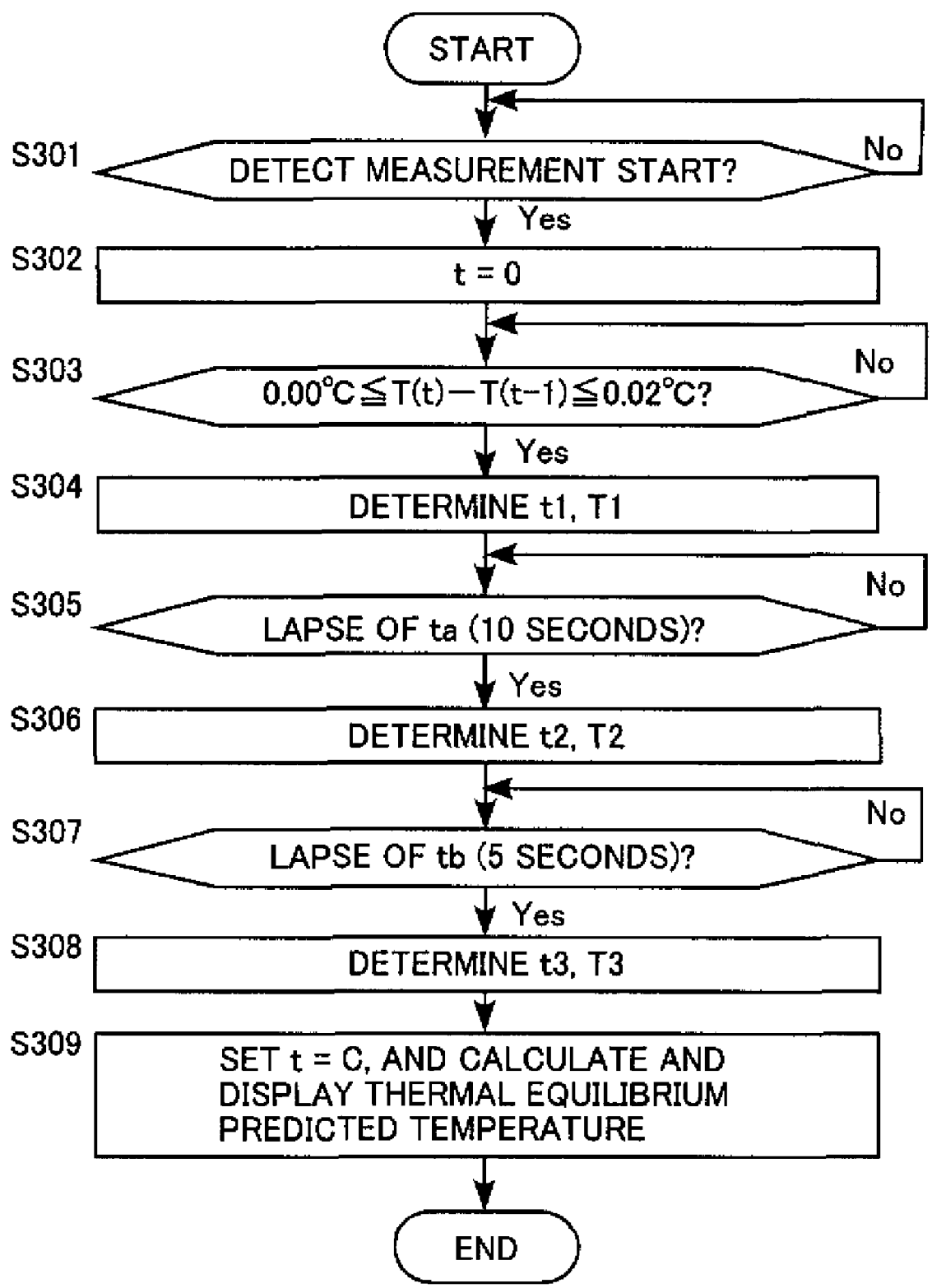
FIG. 11 is a flowchart to explain another operation example for obtaining the predicted temperature of the electronic thermometer according to the present invention.

The flowchart shown in FIG. 11 is almost the same as the flowchart as shown in FIG. 5 as described above, and without performing the aforementioned step of S107, three data point [t1, T1], [t2, T2], and [t3, T3] are obtained by the steps S301 to S308 (corresponding to the steps S101 to S106, S108 and S109 as shown in FIG. 5). By solving the three simultaneous equations obtained by substituting these three data points into the expression (1), the parameter a, the parameter b, and the parameter c are obtained. Then, setting t=C in the prediction function Tu being acquired, the equilibrium temperature is calculated and displayed (S309).

Figure 12:
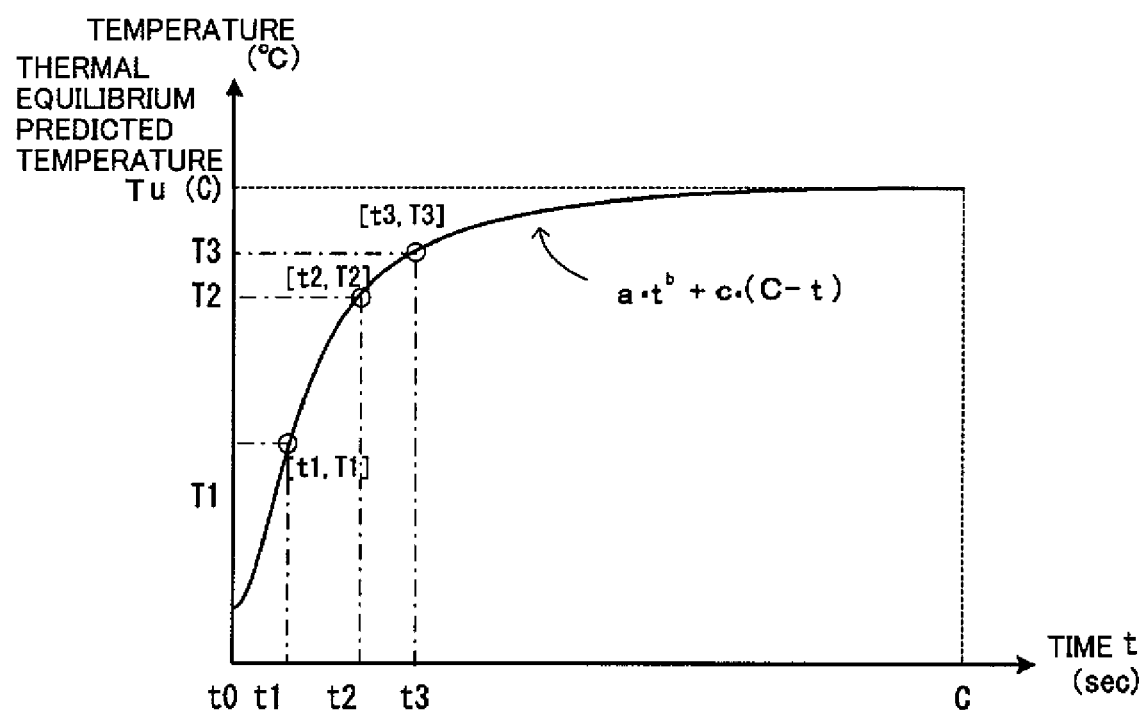
FIG. 12 is a chart of temperature property curve to explain another aspect of the prediction of the electronic thermometer according to the present invention.

FIG. 12 is a chart showing a relationship between the temperature property curve and the data points, in the case where the prediction function Tu is obtained from the three simultaneous equations by using the three data points.

In each of the aspects of the invention described above, the prediction is performed by using three data points. However, in another aspect of the invention the prediction may be performed by using two data points.

Hereinafter, an aspect of the invention to perform the prediction by using two data points in the electronic thermometer according to the present invention will be explained, with reference to the chart of FIG. 13 to explain the configuration of the prediction means, the flowchart of FIG. 14, the temperature property curves of FIG. 15 to explain the operation to obtain the predicted temperature, and a table of FIG. 16 to define the parameter c. Since the configuration of the prediction means in this aspect of the invention is almost the same as the configuration as shown in FIG. 4, a tedious explanation will not be made as for the common parts.

Figure 13:
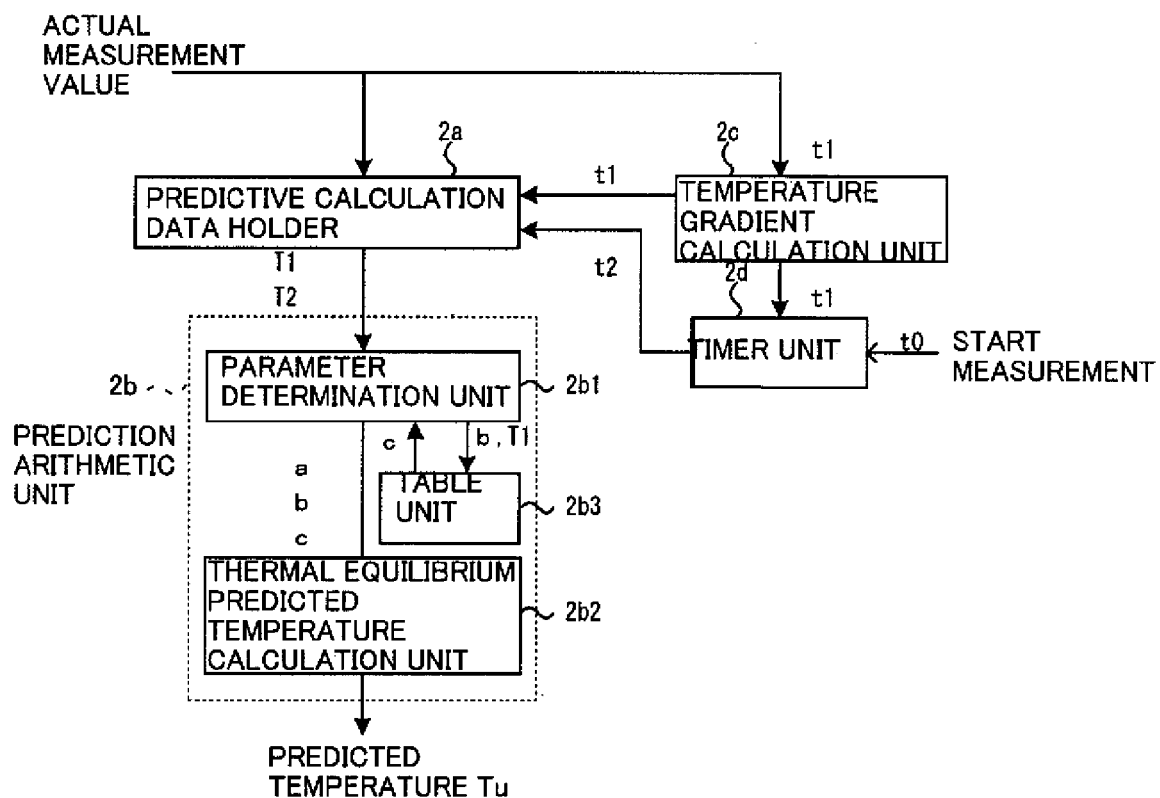
FIG. 13 is a chart to explain a configuration of the prediction means of the electronic thermometer according to the present invention.

In FIG. 13, similar to the configuration as shown in FIG. 4, the prediction means 2 includes the predictive calculation data holder 2a, the prediction arithmetic unit 2b, the temperature gradient calculation unit 2c, and the timer unit 2d. In addition to the parameter determination unit 2b1 and the thermal equilibrium predicted temperature calculation unit 2b2, a table unit 2b3 is provided, which stores a table that determines a relationship among the parameter b, the data point (T1), and the parameter c. The parameter determination unit 2b1 reads from the table unit 2b3, the parameter c associated with the parameter b and the data point (T1), thereby determining the parameter c.

Figure 14:
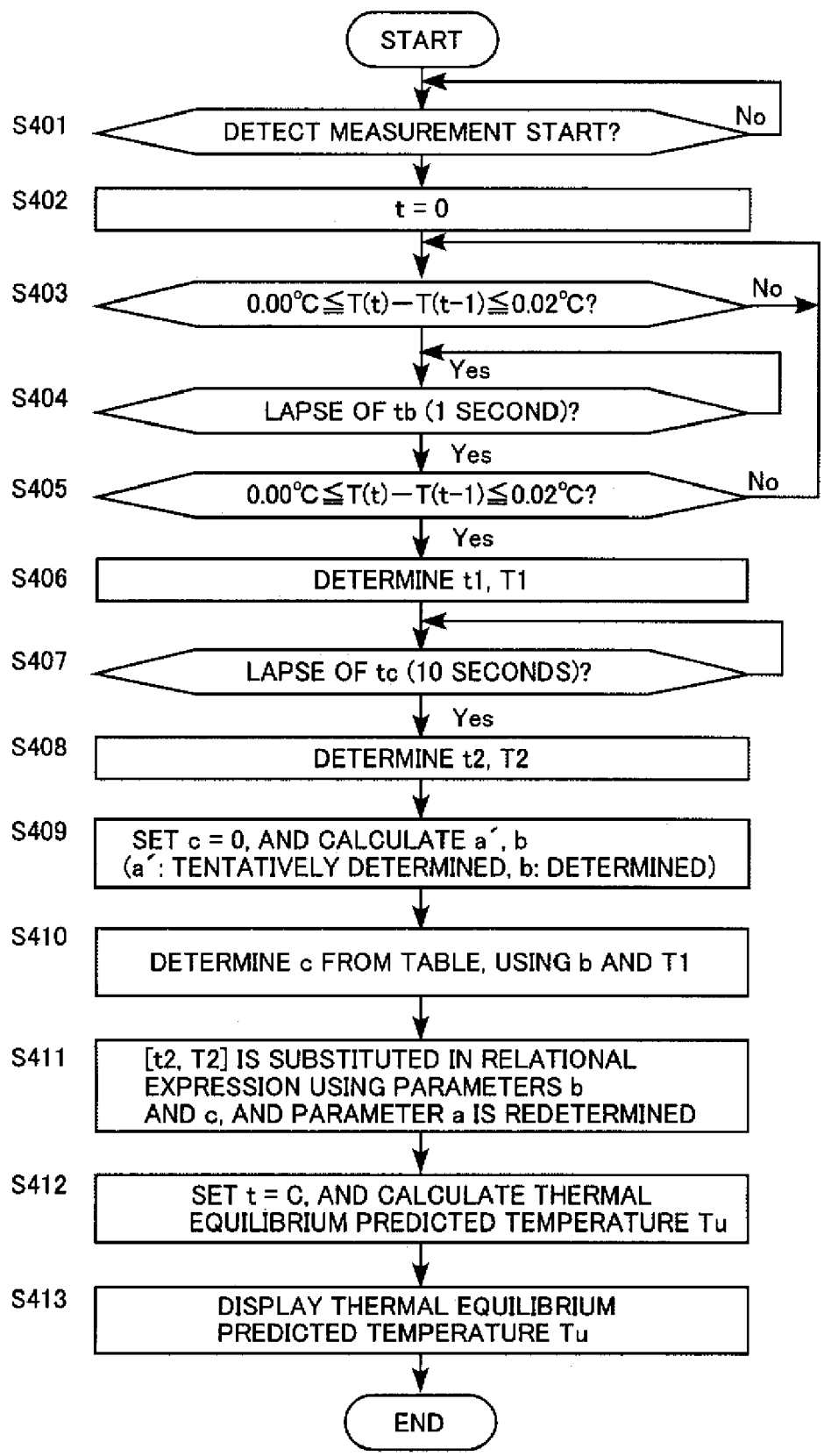
FIG. 14 is a flowchart to explain an operation for obtaining the predicted temperature of the electronic thermometer according to the present invention.

In the flowchart shown in FIG. 14, when the timer unit 2d detects a start of measurement (S401), timekeeping is started setting t=0 (S402). The temperature gradient calculation unit 2c inputs an actual measurement value to calculate the increase rate thereof, and determines whether or not the increase rate is within a predetermined range. For example, it is determined whether or not a difference value between the actual measurement values inputted at predetermined time intervals fall in the predetermined range. When the actual measurement value previously inputted is assumed as "T(t−1)", and the actual measurement value currently inputted is assumed as "T(t)", the determination of the increase rate can be made by determining whether or not the difference "T(t)−T(t−1)" falls within a temperature range, such as between 0.00° C. and 0.02° C.

In this aspect of the invention, when a predetermined time tb (for example, one second) has elapsed after the temperature increase rate falls in the predetermined range (S404), it is determined whether T(t)−T(t−1), i.e., a difference between a newly inputted actual measurement value T(t) and the previously inputted actual measurement value T(t−1), again falls within the predetermined temperature range (for example between 0.00° C. and 0.02° C.). When it is confirmed that there is no large fluctuation in the increase rate, the operation goes into the next step (S405). This operation is performed to confirm that the temperature increase rate is shifting to a stable state with reliability, by excluding a case where the increase rate change happens to fall in the predetermined range for any reason, without following a normal temperature increase. If the difference T(t)−T(t−1) does not fall in the predetermine temperature range once again, it is determined that the judgment as to the temperature increase in the previous step S403 was an error, and the operation returns to S403. Then, the determination is repeated until the temperature difference falls in the predetermined range again (S405).

In the step of S405, if the temperature difference falls in the predetermined range, the time "t1" and the actual measurement value "T1" at that timing are held in the predictive calculation data holder 2a, and the first data point [t1, T1] is determined (S406).

Figure 15A:
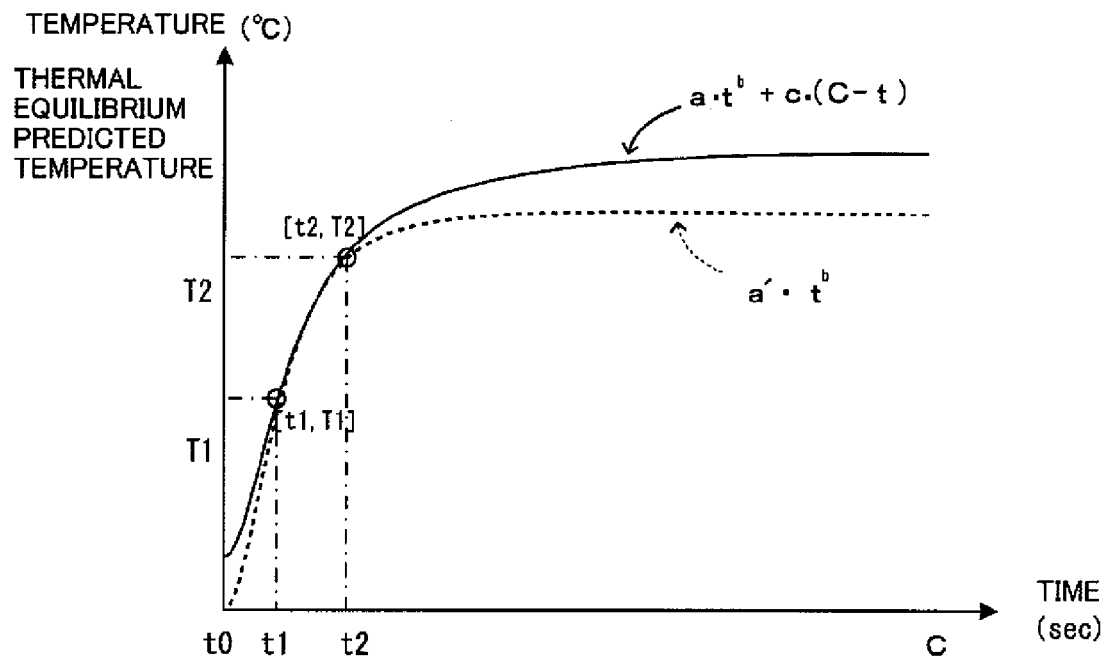
FIG. 15 shows charts of temperature property curve to explain the operation for obtaining the predicted temperature of the electronic thermometer according to the present invention.

The timer unit 2d monitors the lapse of time, and when a predetermined time "tc" has elapsed from the time t1, the predictive calculation data holder 2a is notified of the time "t2" (S407). The predictive calculation data holder 2a holds the time t2 and the actual measurement value "T2" at that timing, and determine the second data point [t2, T2] (S408). The predetermined time tc that determines the second data point [t2, T2] may be ten seconds, by way of example. FIG. 15A shows the two data points [t1, T1] and [t2, T2].

The parameter determination unit 2b1 uses the first data point [t1, T1] and the second data point [t2, T2] to calculate the parameter a and the parameter b of the prediction function Tu. Here, the prediction function Tu is as the following:

Prediction function $Tu=c \cdot (C-t)+a \cdot t\^{}b$ (EXPRESSION 8),

Here, the expression is provided with;
Tu: thermal equilibrium predicted temperature,
t: measuring time from starting of measurement,
a, b, c: parameters,
C: time constant, and
^: exponentiation.

The prediction function Tu is expressed by an arithmetic expression including a term "a·t^b" representing that a growth rate is decreased along with the time "t", and a term "c·(C−t)" serving as a correction term, representing a linear decrease until "0" (time t=C) based on the values of the time "t" and "c·C" (time t=0).

The parameter a and the parameter b at this timing are calculated, assuming that the parameter c is zero, and the parameter b is determined as well as the parameter "a'" is tentatively determined. The tentatively determined "a'" is calculated later, and then the parameter a is redetermined. When the first data point [t1, T1] and the second data point [t2, T2] are substituted into the aforementioned prediction function, the parameter "a'" is tentatively determined according to the following expression:

$lna'=(lnT2 \cdot lnt1 - lnT1 \cdot lnt2)/(lnt1-lnt2)$ (EXPRESSION 9)

Here, the parameter a tentatively determined is represented by "a'".

The parameter b is determined according to the following expression (S409):

$b=ln(T1/T2)/ln(t1/t2)$ (EXPRESSION 10)

Figure 15B:
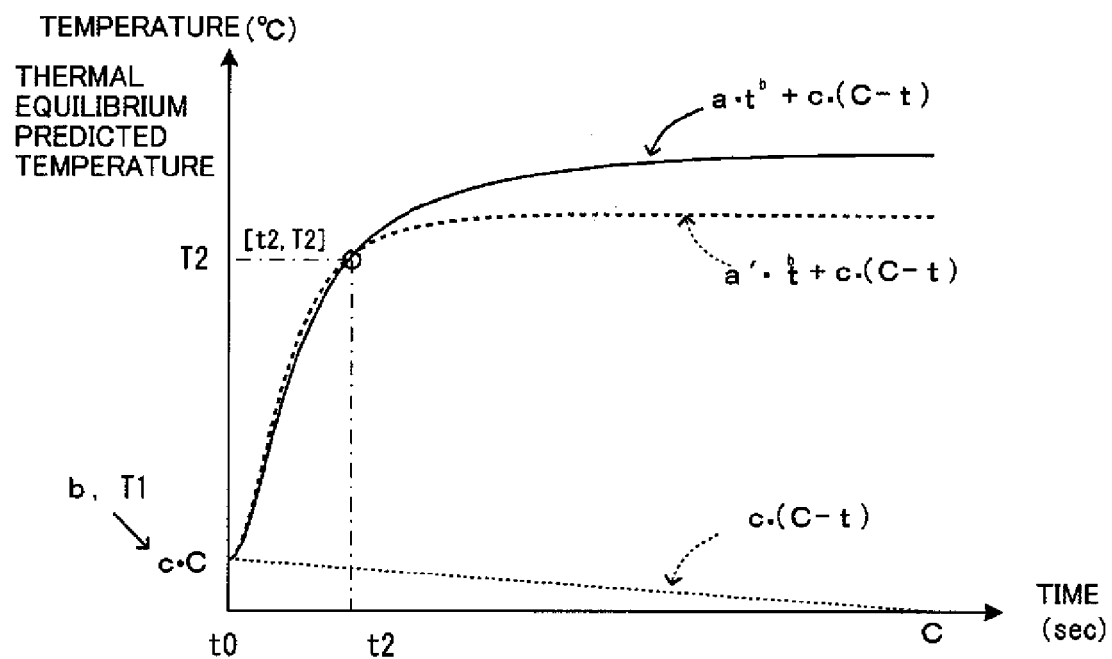

Next, the parameter determination unit 2b1 refers to the table indicating the relationship among the parameter b stored in the parameter determination unit 2b1, the actual measurement value T1 being the first data point, and the parameter c. Then, the parameter c is read out based on the parameter b and the actual measurement value T1 being the first data point, whereby the parameter c is determined. FIG. 15B shows a state that the parameter c is determined.

Figure 16:
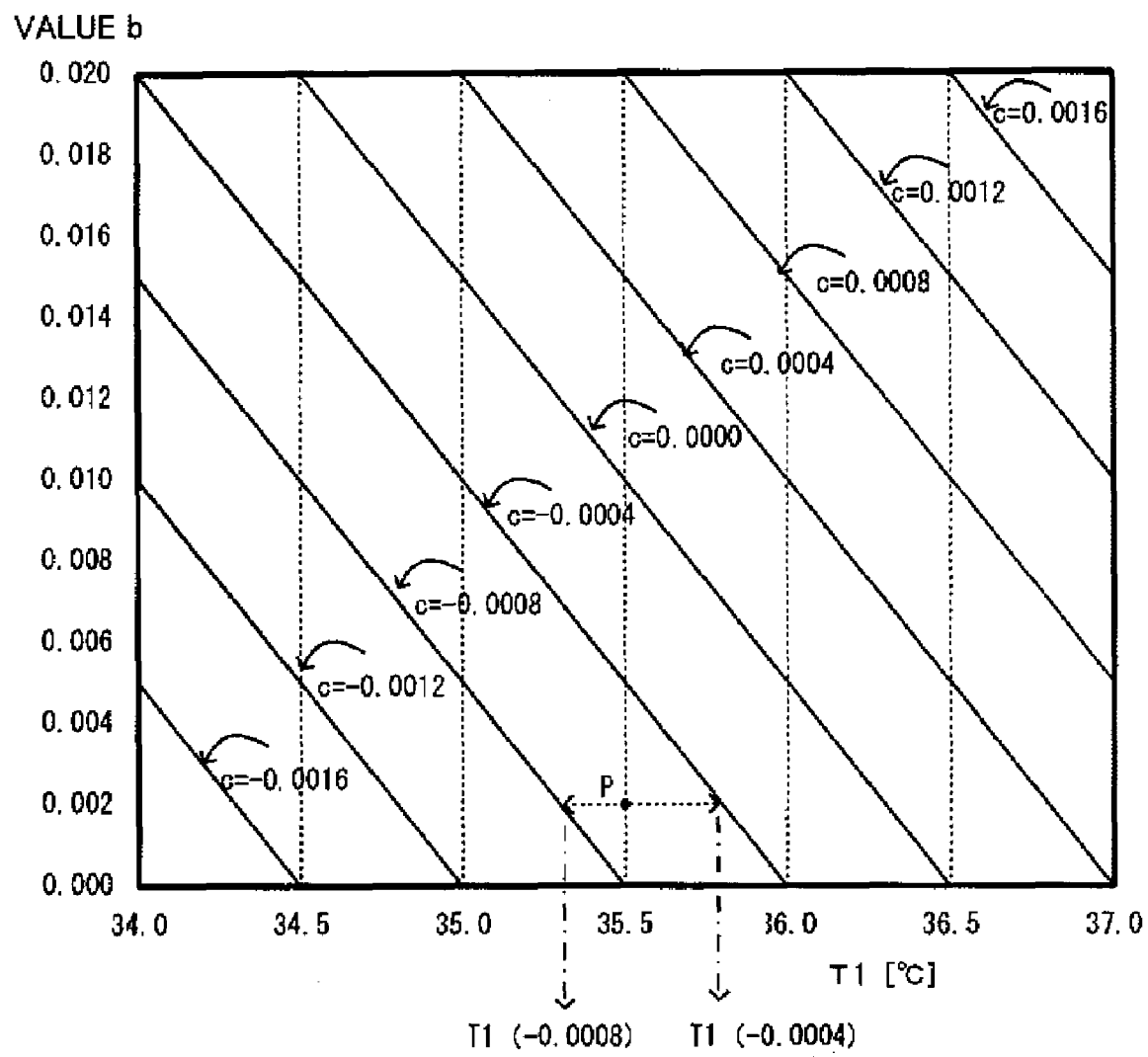
FIG. 16 shows a table to determine the parameter c.

FIG. 16 shows one example of the table. In the table being illustrated, each relationship between the parameter b (displayed on the vertical axis) and T1 (displayed on the horizontal axis) for the value of the parameter c is displayed with respect to each of multiple parameters c. It is to be noted that each parameter c is shown with a spacing of 0.0004. For example, in the relationship between the parameter b and T1 on the line connecting the parameter b being 0.020 and T1 being 36° C., the parameter c is −0.0004.

In FIG. 16, if the combination of the parameter b and T1 is not placed on the line of the parameter c being illustrated, and placed between the lines, the parameter c can be obtained by interpolating a value of the adjacent parameter c.

For example, when the parameter b is 0.002 and T1 is 35.5° C., a line of the relating parameter c is not displayed in FIG. 16. If the parameter c in this case is obtained by interpolation, for example, with respect to the horizontal axis setting the parameter to 0.002, the temperature T1(c=−0.0008) having the parameter c being −0.0008, and the temperature T1(c=−0.0004) having the parameter c being −0.0004 are obtained. According to the interpolation ratio of these two temperatures, the parameter c is obtained by interpolating the parameter c=−0.0008 and the parameter c=−0.0004.

A method to obtain the parameter c when the combination of the parameter b and the T1 is not placed on the illustrated line of the parameter c is not limited to the interpolation method as described above. The parameter c may be determined by an area sectioned by the parameter c.

For example, when the parameter b is 0.002 and T1 is 35.5° C., with respect to the horizontal axis having the parameter b being 0.002, it is found that the value 35.5° C. is positioned in the area between the parameter c is −0.0008 and the parameter c is −0.0004, and in such a case, either one of the values is employed. If a smaller value is employed, it is −0.0008, and if a larger value is employed, it is −0.0004. In the method to determine the parameter c by the area, the degree of precision is deteriorated, compared to the aforementioned interpolation method. However, since it is not necessary to calculate the parameter c by the interpolation ratio, the calculation can be simplified.

Next, since the parameter a is a tentatively determined parameter "a'", the second data point [t2, T2] is substituted into the prediction function Tu represented by the above equation (8), whereby the parameter a is redetermined (S411).

Accordingly, the prediction function Tu represented by the following expression (8) is determined. In FIG. 15B, the prediction function Tu is represented by the solid line.

$$Tu = c \cdot (C-t) + a \cdot t^{\wedge} b \qquad \text{EXPRESSION (11)}$$

The thermal equilibrium predicted temperature can be calculated by setting t=C in the prediction function of the expression (11) (S412). The calculated thermal equilibrium predicted temperature Tu is displayed on the display unit $3b$ (S413).

According to the present aspect of the invention, the parameter c is determined by the parameter b on which a property in the temperature rise has been reflected, and the actual measurement value T1 being the first data, whereby an appropriate parameter c responding to various manners of temperature rise can be determined.

What is claimed is:

1. An electronic thermometer comprising,
   a temperature sensing means for sensing a temperature of a part to be measured, and
   a prediction means for calculating an equilibrium temperature in accordance with the temperature being sensed, wherein,
   the prediction means further comprising,
   a parameter determination unit to determine parameters for a prediction function having three parameters for obtaining an equilibrium predicted temperature:

$$Tu = c \cdot (C-t) + a \cdot t^{\wedge} b$$

wherein
   Tu: thermal equilibrium predicted temperature,
   t: measuring time from starting of measurement,
   a, b, and c: parameters,
   C: time constant, and
   ^: exponentiation, and
   a thermal equilibrium predicted temperature calculation means for calculating an equilibrium temperature during a period of the thermal equilibrium time, based on the parameters determined by the parameter determination unit.

2. The electronic thermometer according to claim 1, wherein,
   the parameter determination unit determines the parameter a, parameter b, and parameter c, based on three sensed temperatures and measuring times thereof,
   the parameter c is set to zero, and the parameter b is determined and the parameter a is tentatively determined, by using a first sensed temperature and the measuring time thereof and a second sensed temperature and the measuring time thereof,
   the measuring time of a third sensed temperature is substituted into the prediction function using the parameter a and the parameter b being obtained, and setting the parameter c to zero, thereby calculating the thermal equilibrium predicted temperature,
   the parameter c is determined by using a difference between the thermal equilibrium predicted temperature being calculated and the third sensed temperature, and
   the parameter a is redetermined by substituting the parameter b, the parameter c, the third sensed temperature, and the measuring time of the third sensed temperature into the prediction function.

3. The electronic thermometer according to claim 1, wherein,
   the parameter determination unit determines the parameter a, the parameter b, and the parameter c according to tree simultaneous equations, obtained by substituting three sensed temperatures and the measuring times thereof into the prediction function.

4. The electronic thermometer according to claim 2, wherein,
   the prediction means further comprises a temperature gradient calculation unit for calculating a temperature gradient based on a temperature sensed by the temperature sensing means, wherein,
   the temperature gradient calculation unit assumes the sensed temperature and the measuring time of the sensed temperature as the first point, at a timing when a temperature gradient of the sensed temperature falls in a predetermined range, among the three sensed temperatures and the measuring times thereof.

5. The electronic thermometer according to claim 4, wherein,
   the prediction means further comprises a timer unit, and the timer unit keeps time from a temperature sensing at the first point, and sets each of the second measuring time and the third measuring time, after a lapse of a predetermined time from the measuring time at the first point.

6. The electronic thermometer according to claim 1, wherein,
   the parameter determination unit determines the parameter a, the parameter b, and the parameter c, based on two sensed temperatures and the measuring times thereof,
   the parameter c is set to zero, and the parameter b is determined and the parameter a is tentatively determined, by using the two sensed temperatures; the first sensed temperature and the second sensed temperature, and the measuring times thereof,
   the parameter c is determined according to a relationship among the parameter b, the first sensed temperature, and the parameter c,
   the parameter a is redetermined by substituting the parameter b, the parameter c, and the second sensed temperature and the measuring time of the second sensed temperature into the prediction function.

7. The electronic thermometer according to claim 6, wherein,
the prediction means further comprises a temperature gradient calculation unit for calculating a temperature gradient based on the temperature sensed by the temperature sensing means, and
the temperature gradient calculation unit assumes the sensed temperature and the measuring time of the sensed temperature as the first point, at a timing when a temperature gradient of the sensed temperature falls in a predetermined range, among the two sensed temperatures and the measuring times thereof.

8. The electronic thermometer according to claim 7, wherein,
the prediction means further comprises a timer unit, and the timer unit keeps time from the temperature sensing at the first point, and assumes the measuring time after a lapse of a predetermined time from the measuring time at the first point, as the measuring time at the second point.

9. The electronic thermometer according claim 1, wherein,
the thermal equilibrium predicted temperature calculation means calculates a thermal equilibrium predicted temperature by substituting the thermal equilibrium prediction time into the measuring time t of the prediction function determined by the parameter a, the parameter b, and the parameter c.

10. The electronic thermometer according to claim 2, wherein,
the thermal equilibrium predicted temperature calculation means calculates a thermal equilibrium predicted temperature by substituting the thermal equilibrium prediction time into the measuring time t of the prediction function determined by the parameter b and the parameter a tentatively determined.

11. The electronic thermometer according to claim 2, wherein,
the thermal equilibrium predicted temperature calculation means calculates a first thermal equilibrium predicted temperature by substituting the thermal equilibrium prediction time into the measuring time t of the prediction function determined by the parameter b and the parameter a being tentatively determined, and calculates a second thermal equilibrium predicted temperature by substituting the thermal equilibrium prediction time into the measuring time t of the prediction function determined by the parameter a, the parameter b, and the parameter c.

12. The electronic thermometer according to claim 1, wherein,
the time constant C is the thermal equilibrium prediction time.

* * * * *